(12) United States Patent
Kang et al.

(10) Patent No.: US 12,216,317 B2
(45) Date of Patent: Feb. 4, 2025

(54) MULTI-CHANNEL OPTICAL SUB-ASSEMBLY

(71) Applicant: Electronics and Telecommunications Research Institute, Daejeon (KR)

(72) Inventors: Eun Kyu Kang, Daejeon (KR); Jong Jin Lee, Daejeon (KR); Dae Seon Kim, Daejeon (KR); Sang Jin Kwon, Daejeon (KR); Won Bae Kwon, Daejeon (KR); Soo Yong Jung, Daejeon (KR); Hae Chung Kang, Daejeon (KR); Dae Woong Moon, Daejeon (KR); Gye Sul Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 185 days.

(21) Appl. No.: 17/879,008

(22) Filed: Aug. 2, 2022

(65) Prior Publication Data
US 2023/0061382 A1 Mar. 2, 2023

(30) Foreign Application Priority Data

Aug. 31, 2021 (KR) .......... 10-2021-0115715
Nov. 25, 2021 (KR) .......... 10-2021-0164634

(51) Int. Cl.
G02B 6/42 (2006.01)
(52) U.S. Cl.
CPC ......... *G02B 6/4251* (2013.01); *G02B 6/4214* (2013.01); *G02B 6/428* (2013.01); *G02B 6/4201* (2013.01)

(58) Field of Classification Search
CPC .................................... G02B 6/428
See application file for complete search history.

(56) References Cited

U.S. PATENT DOCUMENTS 6,384,473 B1* 5/2002 Peterson .......... H01L 27/14618
257/737
6,910,812 B2* 6/2005 Pommer .............. G02B 6/4201
385/24

(Continued)

FOREIGN PATENT DOCUMENTS

JP 2009-42469 2/2009
KR 10-2017-0119480 10/2017

(Continued)

OTHER PUBLICATIONS

Ling Zhang, et al., "EMI Coupling Paths Mitigation in Optical Transceiver Modules", IEEE Transactions on Electromagnetic Compatibility, vol. 59, No. 6, Dec. 2017.

*Primary Examiner* — Michael Stahl
(74) *Attorney, Agent, or Firm* — KILE PARK REED & HOUTTEMAN PLLC

(57) ABSTRACT

A multi-channel optical sub-assembly includes a printed circuit board with a signal processor mounted thereon, a package window mounted on the printed circuit board, the package window including a transparent material, a package mounted on the package window, and an optical device accommodated into an inner space of the package and configured to convert an electrical signal, input from the signal processor, into an optical signal, wherein the electrical signal sequentially passes through a window through electrode buried in the package window and a package through electrode buried in the package and is input to the optical device.

20 Claims, 13 Drawing Sheets

(56) References Cited

U.S. PATENT DOCUMENTS

| | | | |
|---|---|---|---|
| 11,107,770 B1* | 8/2021 | Ramalingam | H01L 25/18 |
| 2009/0226130 A1* | 9/2009 | Doany | G02B 6/4246 |
| | | | 385/14 |
| 2014/0321803 A1* | 10/2014 | Thacker | G02B 6/4274 |
| | | | 385/14 |
| 2017/0052316 A1 | 2/2017 | Kwon | |
| 2019/0391350 A1* | 12/2019 | Evans | G02B 6/4292 |
| 2020/0021363 A1 | 1/2020 | Kang et al. | |
| 2023/0185033 A1* | 6/2023 | Darmawikarta | G02B 6/4232 |
| | | | 385/14 |

FOREIGN PATENT DOCUMENTS

| | | |
|---|---|---|
| KR | 10-1931602 B1 | 3/2019 |
| KR | 10-2001421 B1 | 10/2019 |
| KR | 10-2021-0050415 | 5/2021 |

* cited by examiner

MULTI-CHANNEL OPTICAL SUB-ASSEMBLY

CROSS-REFERENCE TO RELATED APPLICATIONS

This application claims the benefit of the Korean Patent Application No. 10-2021-0115715 filed on Aug. 31, 2021 and 10-2021-0164634 filed on Nov. 25, 2021, which are hereby incorporated by reference as if fully set forth herein.

BACKGROUND

Field of the Invention

The present invention relates to a high speed sup-assembly used in an optical communication network, and more particularly, to a transmitter optical sub-assembly mounted on a printed circuit board (PCB) of a signal processing module.

Discussion of the Related Art

Recently, as data traffic of a 5G and data center network increases rapidly, the market demand for an optical network sub-assembly for transmitting massive data at a high speed without distortion of a signal is rapidly increasing, and an optical sub-assembly for more increasing a data transmission speed through a multichannel has been proposed.

FIG. 1 is a diagram illustrating a structure of an optical sub-assembly of the related art.

Referring to FIG. 1, the optical sub-assembly of the related art includes an electrical sub-assembly (ESA) 10 which generates an electrical signal, a transmitter optical sub-assembly (TOSA) 20 which converts the electrical signal, input from the ESA 10, into an optical signal, and a flexible printed circuit board (FPCB) 30 which connects the ESA 10 to the TOSA 20. Also, an optical sub-assembly structure of the related art illustrated in FIG. 1 is an optical sub-assembly for optical transmission, and in an optical sub-assembly for optical reception, the TOSA 20 illustrated in FIG. 1 is replaced with a receiver optical sub-assembly (ROSA).

The ESA 10 of the related art includes a printed circuit board (PCB) 11 and a signal processor 12 which is mounted on the PCB 11 and is for signal processing.

The TOSA 20 of the related art includes a package 21, and optical devices and light devices mounted in the package 21. The optical devices mounted in the package 21 may include, for example, a sub-mount 22, an optical source device 22 mounted on the sub-mount 22, a collimation lens 24, an optical multiplexer 25, and a focusing lens 26.

The optical devices and light devices 22 to 26 are mounted in the package 21 so as to secure reliability and perform a stable operation and are protected from external physical, chemical, and electrical influences. Particularly, because the reliability of an optical source device 23 for generating an optical signal is relatively very vulnerable compared to an optical reception device, a structure where the optical devices 22 to 26 are mounted in the package is necessary for an optical sub-assembly requiring high reliability.

In FIG. 1, an element referred to by a reference numeral 27 is a package feedthrough, and an element referred to by a reference numeral 28 is a package window. Also, an element referred to by a reference numeral 29 is a bonding wire.

FIG. 2 is an enlarged view of a flexible circuit board illustrated in FIG. 1.

Referring to FIG. 2, an electrical signal transferred from the ESA 10 through the FPCB 30 is input to the optical source device 23 mounted in the package 21 on the basis of an electrical connection method such as the package feedthrough and a bonding wire (29 of FIG. 1) and is converted into an optical signal. In this case, a plurality of optical source devices are arranged in parallel in a certain direction so as to implement a multichannel, and a plurality of lens are arranged to correspond to the optical source device, on the basis of an optical structure.

An optical multiplexer, as illustrated in FIG. 1, is applied for focusing optical signals, which have different wavelengths and are output from a plurality of optical source devices, on one optical fiber.

In such a structure, a length ($L_{fpcb}$) of 15 mm or more is needed for securing flexibility in performing a bonding process on the FPCB 30, in order to connect the package 21 of the TOSA to an electrode of the PCB 11 of the ESA 10. Therefore, a transmission length of an electrical signal transferred at a high speed increases, and the loss of a high frequency signal increases, causing a reduction in a frequency bandwidth.

Moreover, as in FIG. 2, in a bonding process between both end electrodes of the FPCB 30, a package feedthrough electrode of the TOSA 20 and the electrode of the PCB 11, because it is difficult to check positions of electrodes including a dielectric including an opaque material with eyes, an inter-electrode alignment error occurs in a bonding portion. This is a cause of impedance mismatch, and due to such an impedance mismatch, the loss of a high frequency signal increases and a frequency bandwidth is reduced.

SUMMARY

An aspect of the present invention is directed to providing a multi-channel optical sub-assembly having a structure, in which a distance between a package electrode of a transmitter optical sub-assembly and an electrode of a PCB included in an electrical sub-assembly is maximally reduced without a flexible circuit board or an FPCB, and thus, the transmission loss of an electrical signal is minimized.

To achieve these and other advantages and in accordance with the purpose of the invention, as embodied and broadly described herein, there is provided a multi-channel optical sub-assembly including: a printed circuit board with a signal processor mounted thereon; a package window mounted on the printed circuit board, the package window including a transparent material; a package mounted on the package window; and an optical device accommodated into an inner space of the package and configured to convert an electrical signal, input from the signal processor, into an optical signal, wherein the electrical signal sequentially passes through a window through electrode buried in the package window and a package through electrode buried in the package and is input to the optical device.

In an embodiment, the signal processor may be electrically connected to one end portion of the window through electrode by a first electrode junction, and the first electrode junction may include: an electrode provided on a surface of the printed circuit board and electrically connected to the signal processor; and a window outer electrode provided on a first surface of the package window facing the surface of the printed circuit board and electrically connected to the electrode.

In an embodiment, a groove may be formed in a side surface of the package, in order to perform a bonding process on the electrode and the window outer electrode.

In an embodiment, when the package is seen from above, the electrode may be electrically connected to the window outer electrode through a soldering process performed by a solder disposed between the electrode and the window outer electrode and a high-energy laser passing through the package window including the transparent material upward exposed by the groove.

In an embodiment, a bonding pad may be provided on each of a surface of the printed circuit board and a first surface of the package window facing the surface of the printed circuit board, in order to perform a bonding process on the printed circuit board and the package window.

In an embodiment, a groove may be formed in a side surface of the package, and when the package is seen from above, the bonding pad of the printed circuit board may be bonded to the bonding pad of the package window by a high-energy laser passing through the package window including the transparent material upward exposed by the groove.

In an embodiment, one end portion of the package through electrode may be electrically connected to the other end portion of the window through electrode by a second electrode junction, and the second electrode junction may include: a window inner electrode provided on a second surface of the package window and electrically connected to the other end portion of the window through electrode; and a package outer electrode provided on an upper surface of the package, where a second surface of the package window is provided, and configured to electrically connect the window inner electrode to the one end portion of the package through electrode.

In an embodiment, the package may further include a stepped portion protruding one sidewall adjacent to the upper surface of the package among four sidewalls configuring the inner space of the package, and a package inner electrode electrically connecting the other end portion of the package through electrode to the optical device may be provided on a surface of the stepped portion.

In an embodiment, a portion of the package inner electrode may be buried in the package so as to be electrically connected to the other stepped portion of the package through electrode.

In an embodiment, the package inner electrode may be electrically connected to an optical source device included in the optical device a wire bonding process by using a conductive wire.

In an embodiment, the optical device may be mounted on a bottom surface of the inner space by a sub-mount, and the bottom surface may be disposed on the printed circuit board with the package window therebetween.

In an embodiment, heat occurring in the optical device may be dissipated to the outside of the package via the sub-mount and the bottom surface.

In an embodiment, the window through electrode may include a plurality of window through electrodes divided by channel units, and the package through electrode may include a plurality of package through electrodes electrically connected to the plurality of window through electrodes.

In an embodiment, the optical device may include: a plurality of optical source devices configured to convert a plurality of electrical signals, input from the signal processor via the plurality of window through electrodes and the plurality of package through electrodes, into a plurality of lights; a plurality of collimation lenses configured to respectively convert the plurality of lights into a plurality of parallel lights; an optical wavelength multiplexer configured to combine the plurality of lights incident through the plurality of lenses to generate one light traveling through one optical path; and a first mirror configured to change an optical path of the one light, which is incident in a horizontal direction from the optical wavelength multiplexer, to a vertical-direction optical path to irradiate the one light onto the package window.

In an embodiment, the optical device may further include an optical fiber block including a focusing lens configured to focus the one light irradiated from the first mirror through the package window and a second mirror configured to change an optical path of the focused light to a horizontal-direction optical path to transfer the focused light to an optical fiber, and the optical fiber block may be mounted on a first surface of the package window bonded to a surface of the printed circuit board.

In an embodiment, a groove may be formed in one end portion of the printed circuit board, and in bonding the printed circuit board to the package window, the optical fiber block mounted on the first surface of the package window may be accommodated into the groove.

In another aspect of the present invention, there is provided a method of manufacturing a multi-channel optical sub-assembly, the method including: mounting an optical device, converting an electrical signal into an optical signal, on an inner portion of a package where an upper portion is opened; sealing the upper portion of the package with a package window; bonding an end portion of a package through electrode, buried in the package, to an end portion of a window through electrode buried in the package window; mounting the package window, sealing the upper portion of the package, on a printed circuit board on which a signal processor generating the electrical signal is mounted; and bonding the other end portion of the window through electrode to an electrode of the signal processor provided on the printed circuit board.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
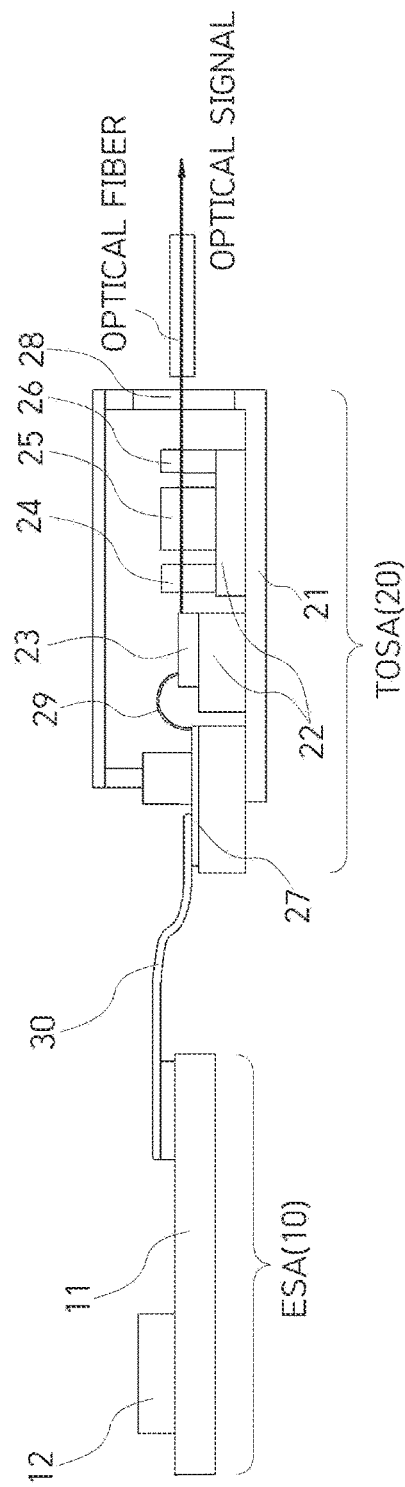
FIG. 1 is a diagram illustrating a structure of an optical sub-assembly of the related art.
Figure 2:
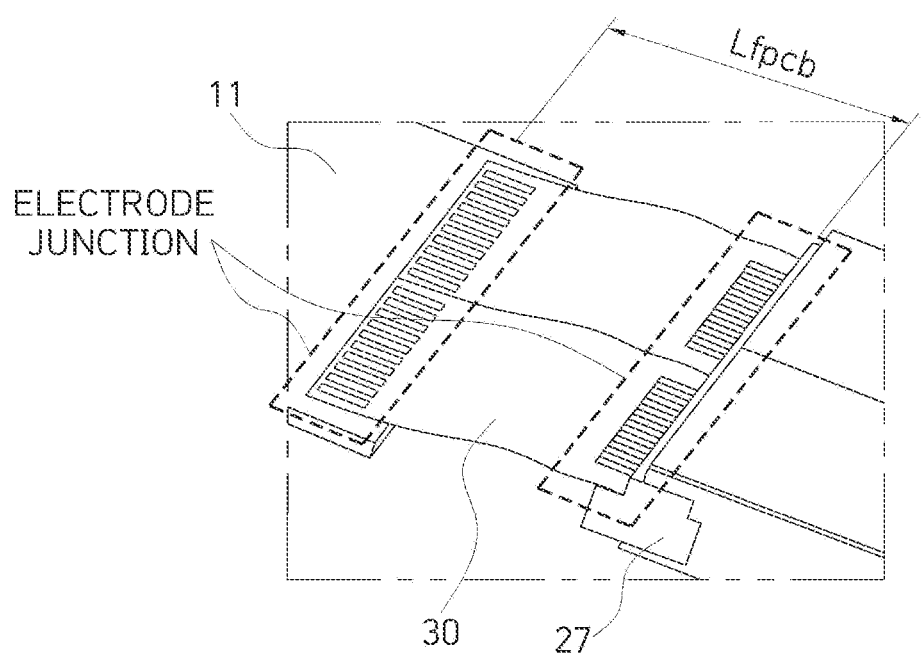
FIG. 2 is an enlarged view of a flexible circuit board illustrated in FIG. 1.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout. Also, in providing description with reference to the drawings, although elements are represented by the same name, reference numeral referring to the elements may be changed, and reference numerals are merely described for convenience of description. It should not be construed that concepts, features, functions, or effects of elements are limited by reference numerals.

Figure 3:
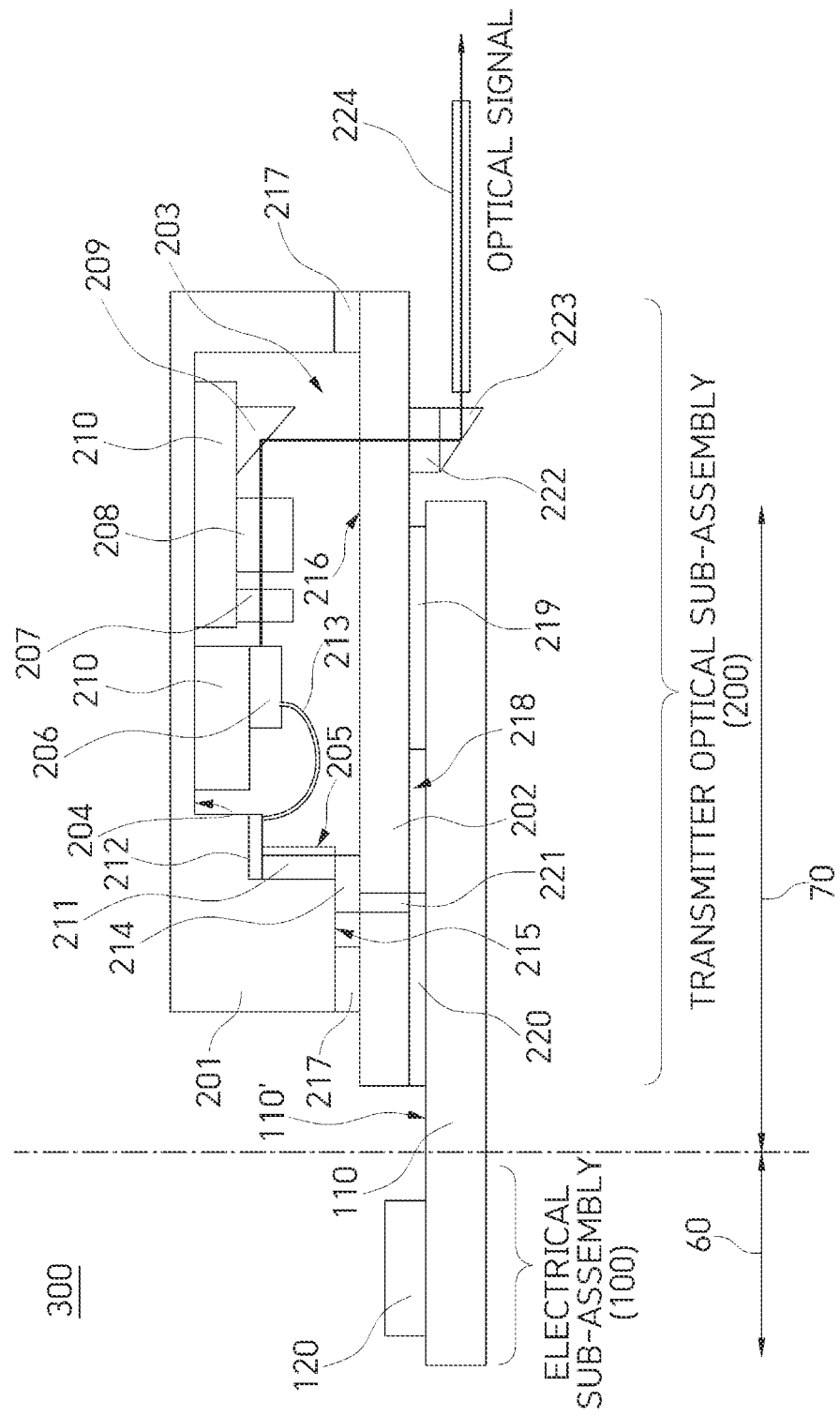
FIG. 3 is a diagram illustrating a cross-sectional structure of an optical sub-assembly structure according to an embodiment of the present invention.

FIG. 3 is a diagram illustrating a cross-sectional structure of an optical sub-assembly structure according to an embodiment of the present invention.

Referring to FIG. 3, unlike an optical sub-assembly of the related art having an electrode connection structure where an electrode of a signal sub-assembly (10 of FIG. 1) and an electrode of a transmitter optical sub-assembly (20 of FIG. 1) are connected to each other in a horizontal direction by using a flexible circuit board 30, an optical sub-assembly (OSA) 300 according to an embodiment of the present invention may be configured in an electrode connection structure where an electrode of an electrical sub-assembly and an electrode of a transmitter optical sub-assembly (TOSA) are connected to each other in a vertical direction via a below-described through electrode, in order to decrease a transmission distance of an electrical signal.

To this end, an optical sub-assembly 300 according to an embodiment of the present invention may include an electrical sub-assembly (ESA) 100 and a TOSA 200.

In an embodiment of the present invention, only a structure of an optical sub-assembly including the TOSA 200 will be described, and a structural feature of the present invention may be identically applied to an optical sub-assembly including a receiver optical sub-assembly. Accordingly, the TOSA 200 illustrated in FIG. 3 may be replaced with a receiver optical sub-assembly.

The ESA 100 may include a printed circuit board (PCB) 110 and a signal processor 120 which is mounted in a first region 60 defined in an upper surface of the PCB 110. The signal processor 120 may generate an electrical signal.

The TOSA 200 may be an element which converts an electrical signal, input from the signal processor 120, into an optical signal and may be mounted in a second region 70 defined in the upper surface of the PCB 110.

The TOSA 200, although not shown in FIG. 3, may be electrically connected to the signal processor 120 by an electrode patterned on the PCB 110, so as to receive the electrical signal from the signal processor 120. Here, the electrode patterned on the PCB 110 may be referred to as an electrode of the signal processor 120.

As described above, the TOSA 200 according to an embodiment of the present invention may be mounted on the PCB 110 included in the ESA 100, and thus, as in an optical sub-assembly of the related art illustrated in FIG. 1, a flexible circuit board (30 of FIG. 1) for electrically connecting an ESA (10 of FIG. 1) and a TOSA (20 of FIG. 1) physically separated from each other may not be needed.

The TOSA 200 mounted on the PCB 110 may include a package 201 and a package window 202.

The package 201 may include an inner space 203 where an upper portion is opened, and the inner space 203 may include a bottom surface 204 and a sidewall 205. Optical devices 206 to 209 may be mounted on the bottom surface 204. Additionally, each of the optical devices may include an optical fiber block which includes a focusing lens 222 and a second mirror 223. Here, the optical fiber block may not be mounted on the bottom surface 204 configuring the inner space 203 of the package 201 and may be mounted on an upper surface of the package window 202. The upper surface of the package window 202 may be a surface which is bonded to a surface of the PCB 110, and in claims defined in the present invention, may be referred to as a first surface.

An optical device mounted on the bottom surface 204 of the inner space 203 may include, for example, an optical source device 206 such as a laser diode, a collimation lens 207, an optical wavelength multiplexer 208, and a first mirror 209. In this case, the optical source device 206, the collimation lens 207, the optical wavelength multiplexer 208, and the first mirror 209 may be mounted on the bottom surface of the inner space 203 by one or more sub-mounts 210.

A package through electrode 211 extending in a vertical direction may be buried in a sidewall 205 of the package 201, and a package inner electrode 212 extending from one end portion of the package through electrode 211 and the optical source device 206 may be electrically connected to each other by a conductive wire 213 through a wire bonding process. The other end portion of the package through electrode 211 may be electrically connected to the package window 202 by a second electrode junction 214.

Although described below, the second electrode junction 214 may include a package outer electrode which is provided on an upper surface 215 of the package 201 and a window inner electrode which is provided on a lower surface 216 (a second surface) of the package window 202. Here, the lower surface 216 (the second surface) of the package window 202 may be a surface which is opposite to an upper surface 218 (a first surface) of the package window 202 and may be defined as a surface which is provided in the upper surface 215 of the package 201. In the claims defined in the present invention, the lower surface 216 of the package window 202 may be referred to as a second surface.

The lower surface 216 (the second surface) of the package window 202 may be bonded to the upper surface 215 (a first surface) of the package 201 by a sealing junction 217, and thus, may cover an opened upper portion of the package 201 and may seal the inner space 203 of the package 201.

A bonding pad 219 may be provided on the upper surface 218 (the first surface) of the package window 202 so that the package window 202 is bonded to a surface of the PCB 110 through a soldering process.

Moreover, the upper surface 218 of the package window 202 may be electrically connected to the upper surface of the PCB 110 by a first electrode junction 220.

Although described below, the first electrode junction 220 may include a window outer electrode which is provided on the upper surface 218 of the package window 202 and an electrode which is provided on an upper surface 110' of the PCB 110.

Moreover, the window through electrode 221 passing through the package window 202 may be buried in the package window 202, one end portion of the window through electrode 221 may be electrically connected to the second electrode junction 214, and the other end portion of the window through electrode 221 may be electrically connected to the first electrode junction 220.

Moreover, the focusing lens 222 and the second mirror 223 coupled to the focusing lens 222 may be mounted on the upper surface 218 (the first surface) of the package window 202.

Hereinafter, an operating process of an optical sub-assembly according to an embodiment of the present invention will be described.

An electrical signal transferred from the signal processor 120 of the ESA 100 may be transferred to the first electrode junction 220 through an electrode (112 of FIG. 11) patterned on the PCB 110 of the ESA 100.

Subsequently, the electrical signal transferred to the first electrode junction 220 may be transferred to the second electrode junction 214 via the window through electrode 221 buried in the package window 202.

Subsequently, the electrical signal transferred to the second electrode junction 214 may sequentially pass through the package through electrode 211 buried in the package 201 and the package inner electrode 212 and the conductive wire 213 which extend from the one end portion of the package through electrode 211 and may be transferred to the optical source device 206.

Subsequently, the optical source device 206 may convert the electrical signal, transferred through the conductive wire 213, into light, the collimation lens 207 may convert the converted light into parallel light, and the parallel light may be incident on the optical wavelength multiplexer 208.

Subsequently, the optical wavelength multiplexer 208 may combine parallel light, which is incident from the collimation lens 207, with parallel light which is incident from a collimation lens (not shown) of another channel through another optical path and has a different wavelength, on the basis of a wavelength multiplexing process.

An optical path of parallel light combined by the optical wavelength multiplexer 208 may be changed to a package window direction by the first mirror 209, and parallel light where an optical path is changed may pass through the package window 202.

Finally, parallel light passing through the package window 202 may pass through the focusing lens 222 mounted on the upper surface of the package window 202, and thus, an optical path thereof may be changed by the second mirror 223. Parallel light where an optical path is changed may be focused on an optical fiber 224 by the second mirror 223.

As described above, the optical sub-assembly 100 according to an embodiment of the present invention may be designed in a structure where the TOSA 200 is mounted on the PCB 110 included in the ESA 100 (i.e., a structure where the ESA 100 and the TOSA 200 share one PCB 110), and thus, may be designed in an electrode connection structure where the ESA 100 is connected to the TOSA 200 in a vertical direction, without a flexible printed board of the related art. Accordingly, a transmission distance of an electrical signal between the ESA 100 and the TOSA 200 may be considerably reduced.

Moreover, the TOSA 200 according to an embodiment of the present invention may be configured to include the package 201 including an inner space with an optical device accommodated thereto and the package window 202 covering an upper portion of the package 201, and moreover, may be designed in a mount structure where the package window 202 is bonded onto the PCB 110 included in the ESA 100. That is, the TOSA 200 may be mounted on the PCB 110 in a state where the TOSA 200 is reversed, so that a bottom surface of the package 201 faces an upper portion. Based on such a mount structure, a heat dissipation characteristic of the TOSA 200 may be enhanced.

Because a heat transfer characteristic of the PCB 110 is vulnerable generally, heat occurring in the TOSA 200 may not be effectively dissipated. Particularly, the heat dissipation of the optical source device 206 where performance is reduced in a high temperature environment may be very important consideration factor.

In the present invention, because the TOSA 200 is mounted on the PCB 100 in a state where the TOSA 200 is reversed so that the bottom surface of the package 201 faces an upper portion, the sub-mount 210 may function as a heat transfer medium and may easily dissipate heat, transferred from the optical source device 206, to the outside through the bottom surface 204 of the package 201, and thus, a heat dissipation characteristic of the optical source device 206 may be enhanced.

Hereinafter, detailed structures of essential elements included in the OSA 300 according to an embodiment of the present invention will be described in detail.

Figure 4:
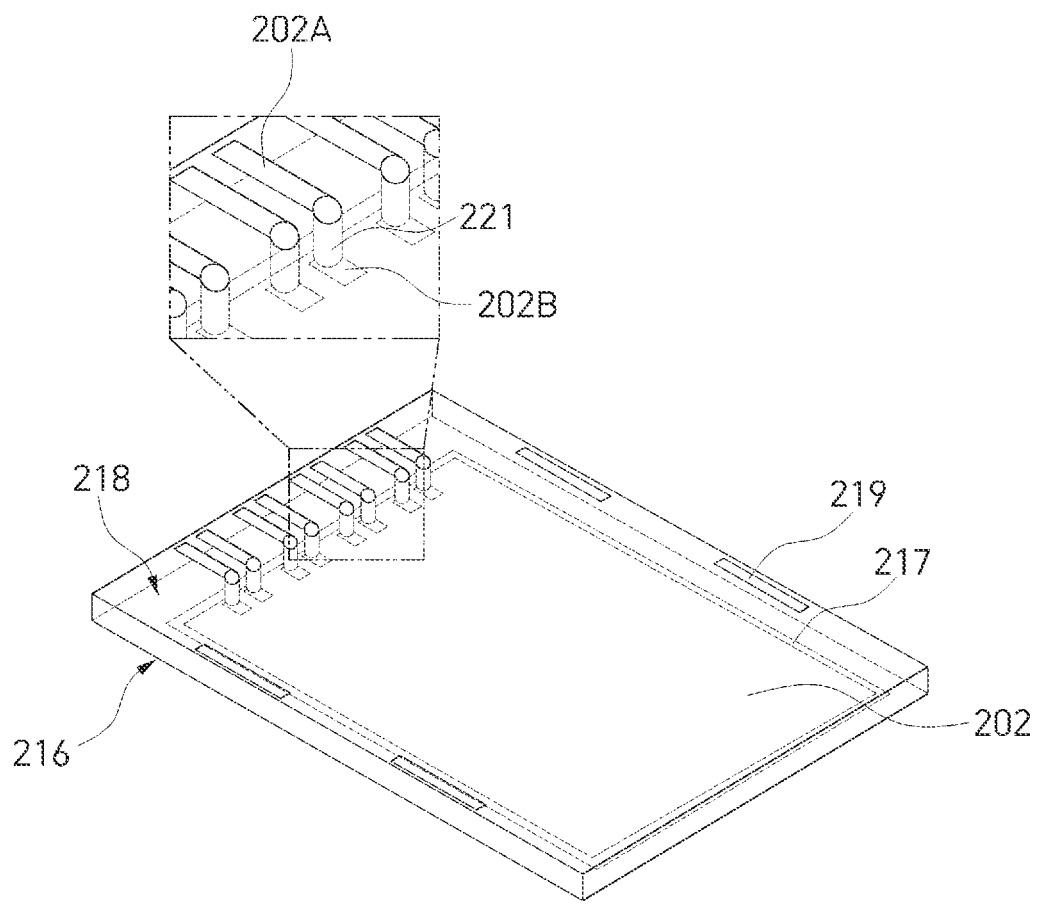
FIG. 4 is a perspective view of a package window according to an embodiment of the present invention.

FIG. 4 is a perspective view of a package window according to an embodiment of the present invention.

Referring to FIG. 4, as described above, the package window 202 may cover an opened upper portion of the package 201 and may transmit light reflected by the first mirror 209.

In order to transmit light reflected by the first mirror 209, the package window 202 may include a transparent material such as glass or quartz glass.

The upper surface 218 (the first surface) of the package window 202 may be a surface which is bonded to a surface (110' of FIG. 3) of a PCB (110 of FIG. 3), and a plurality of window outer electrodes 202A provided by channel units may be arranged in an upper region of the upper surface 218 (the first surface).

The lower surface 216 (the second surface) of the package window 202 may be a surface which is bonded to the upper surface of the package 201, and a plurality of window inner electrodes 202B may be provided on the lower surface 216 (the second surface).

A plurality of window through electrodes 221 electrically connecting the plurality of window outer electrodes 202A to the plurality of window inner electrodes 202B may be buried in the package window 202.

Each of the window outer electrodes 202A may be electrically connected to an electrode (an electrode of the signal processor 120) provided on the surface (110' of FIG. 3) of the PCB (110 of FIG. 3) and may configure the first electrode junction (220 of FIG. 3) along with the electrode of the PCB (110 of FIG. 3).

Each of the window inner electrodes 202B may be electrically connected to a below-described package outer electrode and may configure the second electrode junction (214 of FIG. 3) along with the package outer electrode.

In order to bond the upper surface 218 (the first surface) of the package window 202 to the surface (110' of FIG. 3) of the PCB 110 by using a soldering process, at least one bonding pad 219 may be provided in each of a left region and a right region of the upper surface 218 (the first surface) of the package window 202.

Moreover, in order to bond the lower surface 216 (the second surface) of the package window 202 to the upper surface of the package 201 by using a soldering process, the sealing junction 217 may be formed in an edge region in the lower surface 216 (the second surface) of the package window 202.

Furthermore, in order to minimize a reflectance of light (in order to increase a transmittance of light, an anti-reflection coating film may be coated on a surface on which light reflected by the first mirror 209 in the lower surface 216 (the second surface) of the package window 202 is incident and a surface, to which light is discharged, of the upper surface 218 of the package window 202, on the basis of an anti-reflection (AR) coating process.

Figure 5:
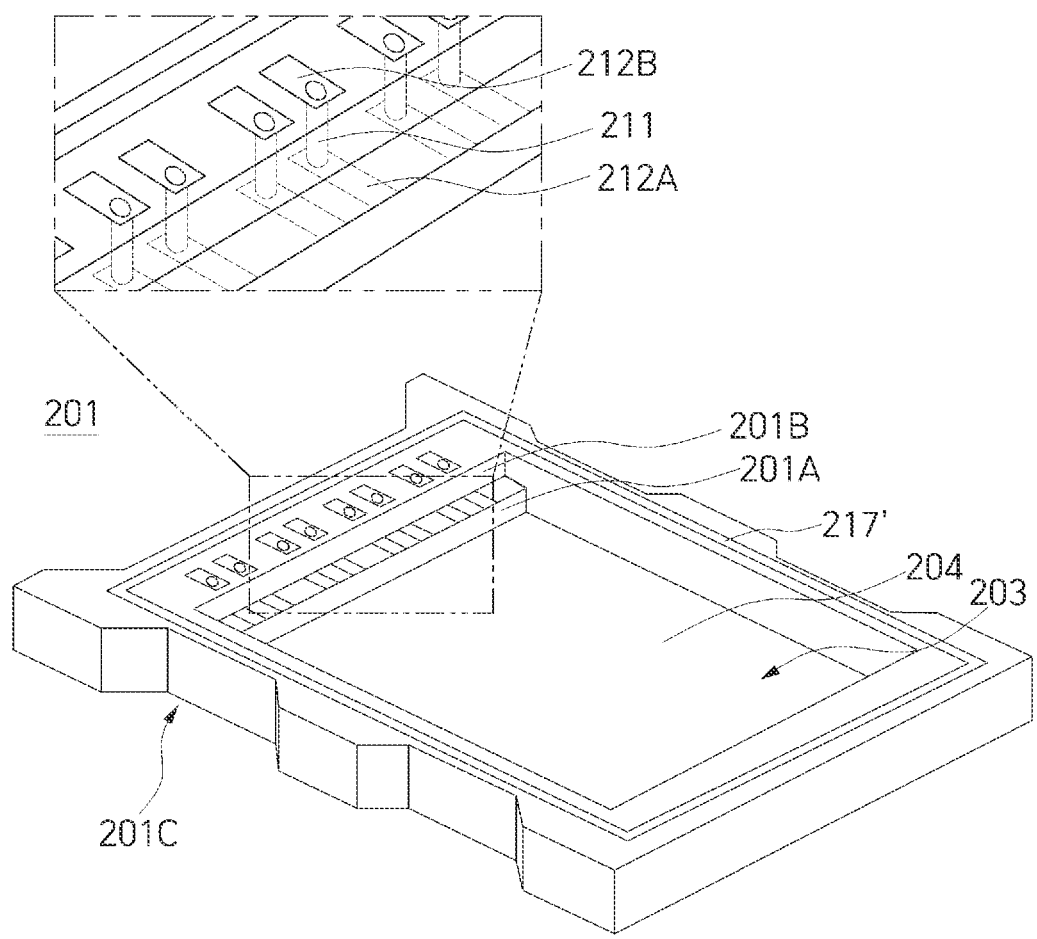
FIG. 5 is a perspective view of a package according to an embodiment of the present invention.
Figure 6:
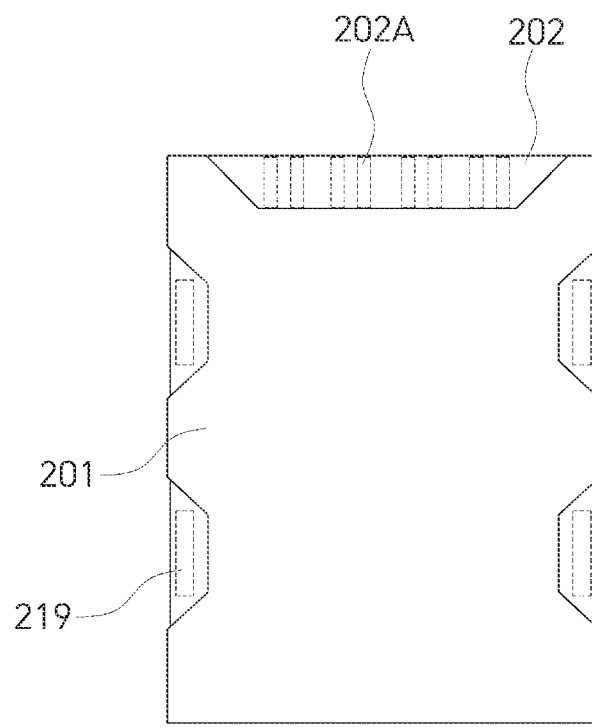
FIG. 6 is a plan view as the package is seen from above in a state where the package illustrated in FIG. 5 is bonded to a package window.

FIG. 5 is a perspective view of a package 201 according to an embodiment of the present invention. FIG. 6 is a plan view as the package is seen from above in a state where the package illustrated in FIG. 5 is bonded to a package window.

Referring to FIG. 5, the package 201 according to an embodiment of the present invention may include an inner space 203 where an upper portion is opened, the inner space 203 may be configured by a bottom surface 204 and four sidewalls, and optical devices such as an optical source device 206, a collimation lens 207, an optical wavelength multiplexer 208, and a first mirror 209 may be mounted on the bottom surface 204 by using a sub-mound (210 of FIG. 3).

A stepped portion 201A protruding from a sidewall 201B may be formed in the one sidewall 201B of the four sidewalls. A plurality of package inner electrodes 212A may be arranged in parallel on a surface of the stepped portion 201A. In this case, a portion of each of the package inner electrodes 212A may be buried in the package 201 so as to be electrically connected to one end portion of a package through electrode 211. Also, a plurality of package outer electrodes 212B may be arranged in parallel on an upper surface adjacent to the sidewall 201B.

The plurality of package through electrodes 211 may be buried in the sidewall 201B, and the package inner electrode 212A and the package outer electrode 212B may be electrically connected to each other by a corresponding package through electrode 211.

Each package inner electrode 212A may be electrically connected to a corresponding optical source device (206 of FIG. 3) by a conductive wire, and each package outer electrode 212B may be electrically connected to a corresponding window inner electrode 202B provided on the lower surface 216 (the second surface) of the package window 202.

A sealing junction 217', bonded to a sealing junction 217 formed along an edge of the lower surface 216 (the second surface), may be formed on a surface where an upper surface of the package 201 (i.e., a surface where the lower surface 216 (the second surface) of the package window 202) is provided.

A groove 201C may be formed in a side surface of the package 201. When the package 201 is seen from above in a state where the package 201 is bonded to the package window 202, as illustrated in FIG. 6, a partial surface (or a portion of a lower surface or a second surface) of the package window 202 may be upward exposed by the groove 201C which is formed in the side surface of the package 201.

The package window 202 may include a transparent material, and thus, the window outer electrode 202A and a bonding pad 219 mounted on an upper surface (218 of FIG. 3) of the package window 202 may be observed with eyes through the upward exposed package window 202.

In bonding the TOSA 200 to the PCB 110, a worker may perform position alignment while checking positions of an electrode of the PCB 110 and the window outer electrode 202A, through the package window 202 upward exposed by the groove 201C.

The window outer electrode 202A and the bonding pad 219 may be bonded to each of a bonding pad and an electrode provided on the PCB 110 by using a soldering process, and in this case, a noncontact laser soldering process having advantages such as massive production and local heating may be used.

That is, by using a solder and a high-energy laser passing through the package window 202 selectively exposed by the groove 201C, the window outer electrode 202A and the bonding pad 219 may be bonded to each of the bonding pad and the electrode of the PCB 110.

A material of the package 201 according to an embodiment of the present invention may include various dielectrics (for example, $Al_2O_3$, AlN, Si, etc.) which are easy to transfer heat, and a shape of the groove 201C formed in the side surface of the package 201 may be formed as various shapes such as a circular shape and a tetragonal shape.

Figure 7:
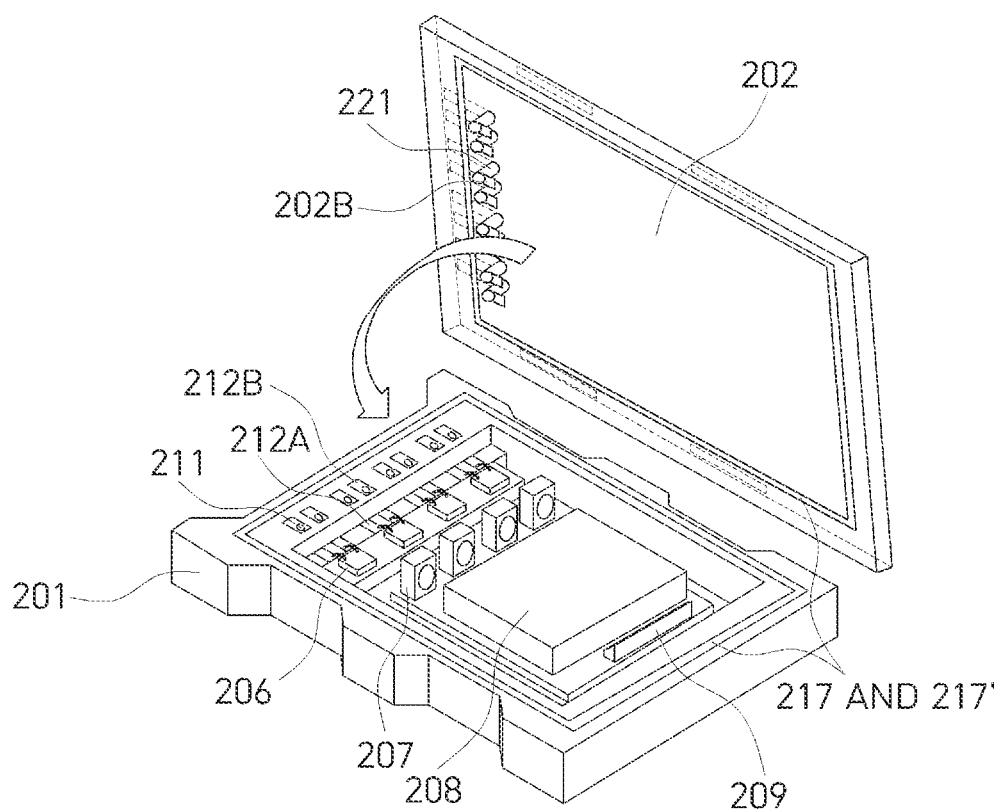
FIG. 7 is a perspective view illustrating a whole external appearance of a transmitter optical sub-assembly seen in a state where a package and a package window according to an embodiment of the present invention are coupled to each other.
Figure 8:
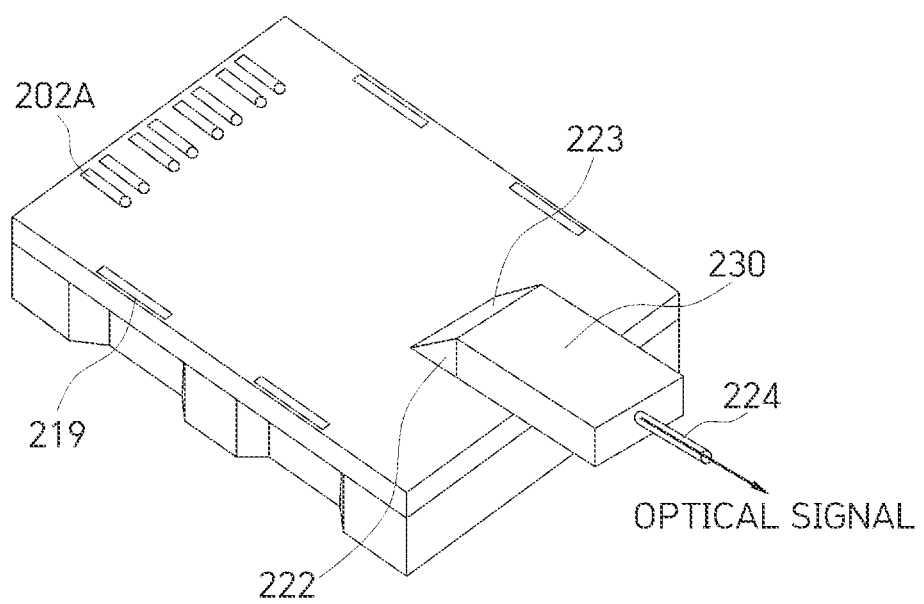
FIG. 8 is a perspective view illustrating an internal structure of a package in a state where the package window and the package illustrated in FIG. 7 are decoupled from each other.

FIG. 7 is a perspective view illustrating a whole external appearance of a transmitter optical sub-assembly seen in a state where a package and a package window according to an embodiment of the present invention are coupled to each other. FIG. 8 is a perspective view illustrating an internal structure of a package in a state where the package window and the package illustrated in FIG. 7 are decoupled from each other.

First, referring to FIG. 7, a plurality of optical sources 206 divided by channel units, a plurality of collimation lenses 207 divided by channel units, an optical wavelength multiplexer 208, and a first mirror 209 may be mounted on an inner bottom surface of a package 201 by a sub-mount.

Referring to FIG. 8, an optical fiber block 230 including a focusing lens 222 and a second mirror 223 may be mounted on an upper surface 218 (a first surface) of a package window 202 through an optical alignment process with optical devices 206 to 209 mounted in the package 201.

As described above, in a TOSA according to an embodiment of the present invention, some devices 206 to 209 configuring an optical device may be mounted in the package 201, and the other devices (optical fiber blocks 222 and 223) may be mounted on an upper surface 218 (a first surface) of the package window 202.

Figure 9:
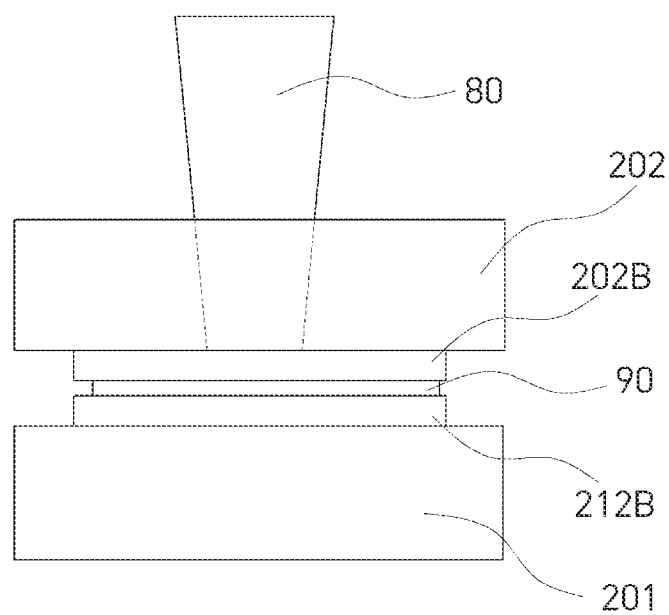
FIG. 9 is a diagram for describing a soldering process of electrically connecting a package and a package window according to an embodiment of the present invention.

FIG. 9 is a diagram for describing a soldering process of electrically connecting a package and a package window according to an embodiment of the present invention.

Referring to FIG. 9, in a state where a solder layer 90 is disposed between a package outer electrode 212B and a window inner electrode 202B, a high-energy laser 80 passing through a package window 202 may be irradiated onto the window inner electrode 202B, and then, the solder layer 90 may be melted by inducing a local heating reaction caused by laser absorption which occurs in the electrodes 212B and 202B formed of a metal material. Subsequently, the solder layer 90 may be coagulated by blocking the high-energy laser 80.

Likewise, a package 201 may be bonded to the package window 202 by a process of melting and coagulating the solder layer 90 through a process of irradiating the high-energy laser onto a sealing junction 217, and thus, hermeticity may be maintained at a junction portion.

Figure 10:
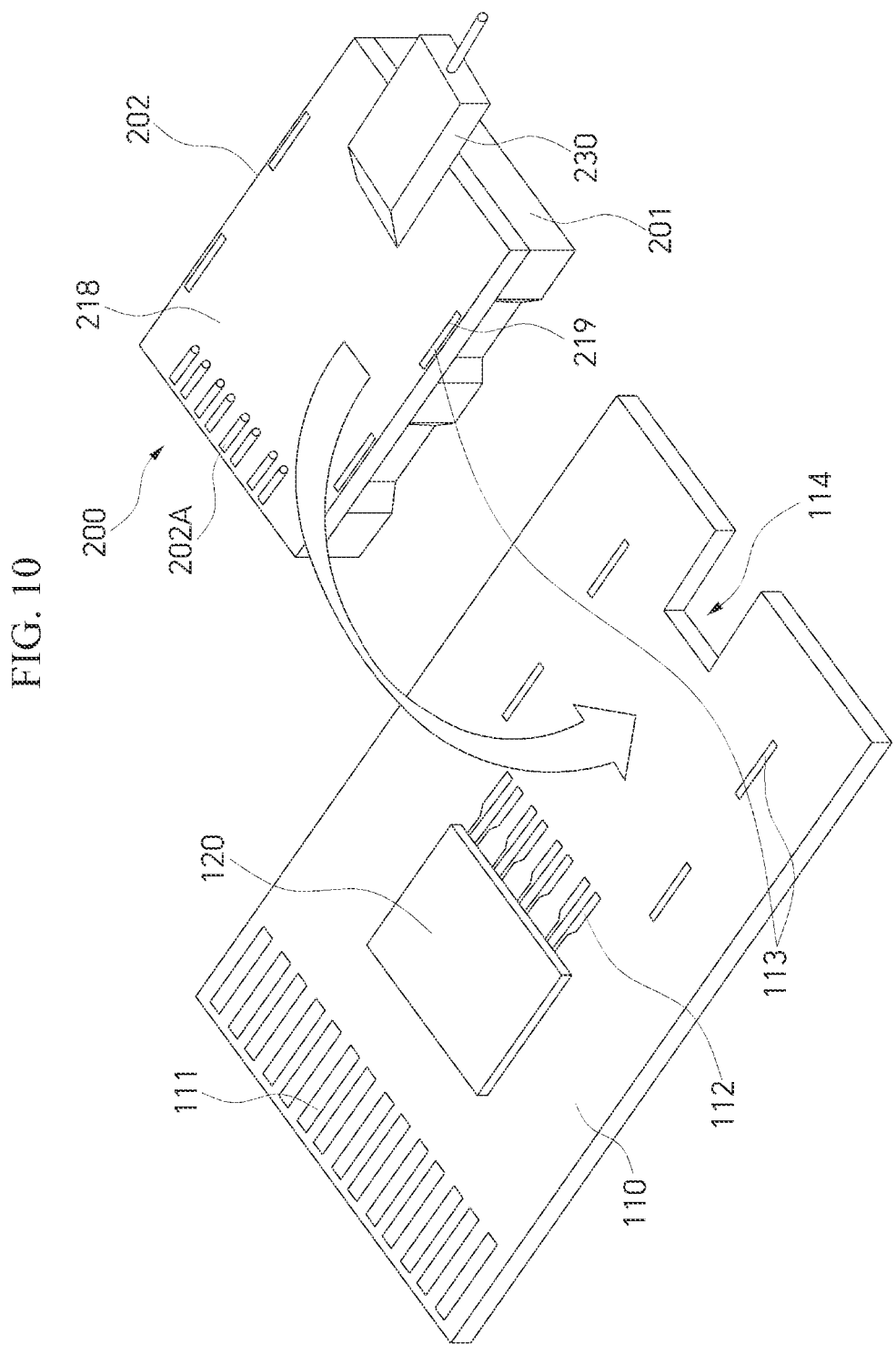
FIG. 10 is a perspective view of a printed circuit board according to an embodiment of the present invention.

FIG. 10 is a perspective view of a PCB according to an embodiment of the present invention.

Referring to FIG. 10, a signal processor 120 may be mounted on a PCB 110, and a plurality of input/output terminals 111 may be formed. Also, bonding pads 113 which are bonded to electrodes 112 of the signal processor 120 and bonding pads 219 provided on an upper surface 218 of a package window 202 through a soldering process (a noncontact laser soldering process) may be further formed on the PCB 110.

The electrodes 112 may be electrically bonded to window outer electrodes 202A provided on the upper surface 218 of the package window 202 through the soldering process (the noncontact laser soldering process).

A groove 114, into which an optical fiber block 230 mounted on the upper surface 218 of the package window 202 is accommodated, may be formed in one end portion of the PCB 110.

In a process of bonding the PCB 110 to a TOSA 200, the optical fiber block 230 may be accommodated into the groove 114 of the PCB 110, and thus, may be safely protected from an external physical impact.

As described above, in order to realize the efficient heat dissipation of the TOSA 200, the TOSA 200 may be mounted on the PCB 110 so that a bottom of a package 201 is upward exposed.

Figure 11:
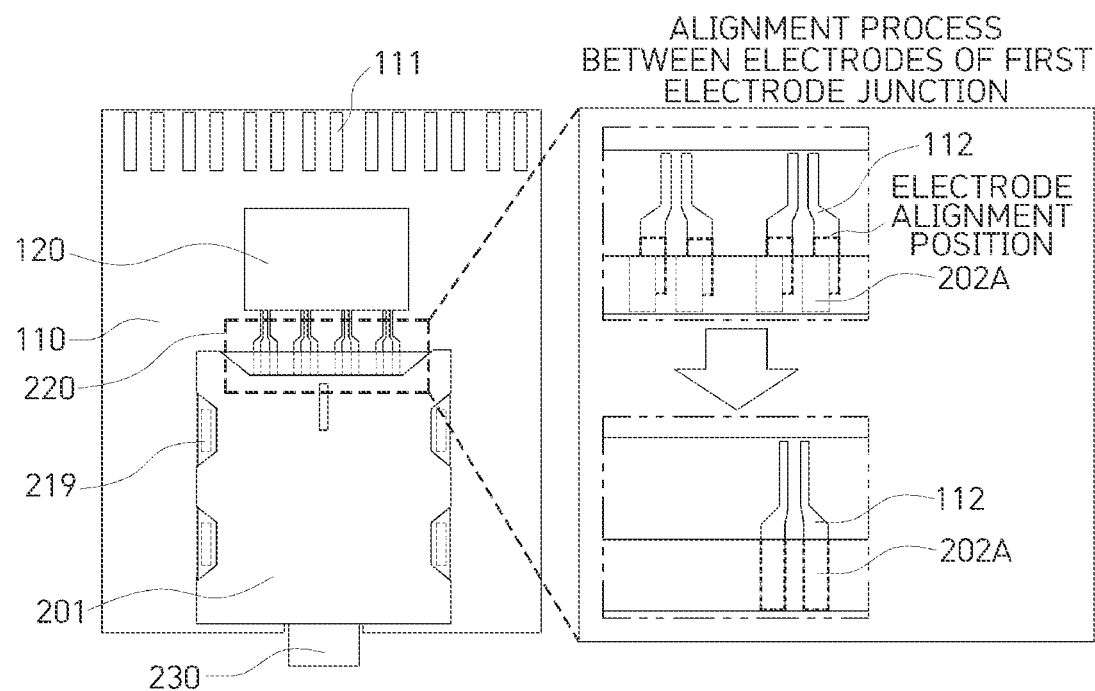
FIG. 11 is a diagram for describing a position alignment process between an electrode of a printed circuit board and a window outer electrode of a package window in a process of mounting a transmitter optical sub-assembly on the printed circuit board illustrated in FIG. 10.

FIG. 11 is a diagram for describing a position alignment process between an electrode of a printed circuit board and a window outer electrode of a package window in a process of mounting a transmitter optical sub-assembly on the printed circuit board illustrated in FIG. 10.

As illustrated in FIG. 11, the electrode 112 of the signal processor 120 and the window outer electrode 202A configuring a first electrode junction 220 may be checked with eyes through a transparent package window 202 which is upward exposed by a groove 201C formed in a side surface of the package 201, and thus, position alignment between the window outer electrode 202A and an electrode 112 of the PCB 110 may be precisely performed.

Figure 12:
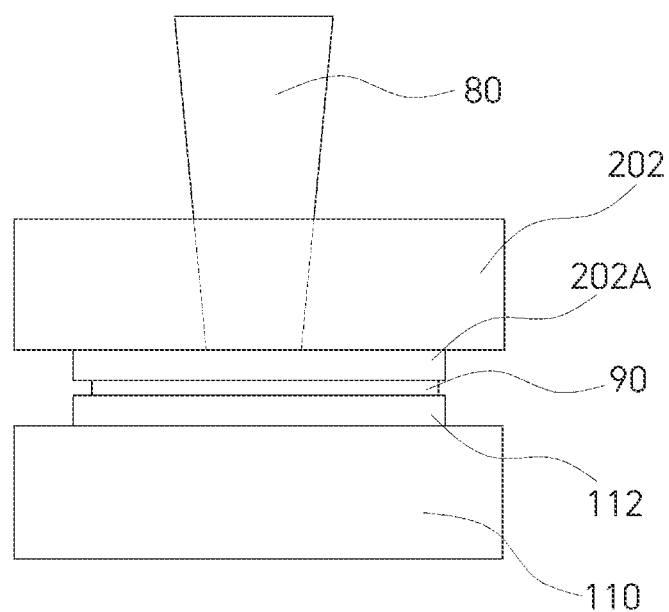
FIG. 12 is a diagram for describing a soldering process of electrically connecting a window outer electrode to an electrode of a printed circuit board by using a high-energy laser according to an embodiment of the present invention.

FIG. 12 is a diagram for describing a soldering process of electrically connecting a window outer electrode to an electrode of a printed circuit board by using a high-energy laser according to an embodiment of the present invention.

Referring to FIG. 12, a window outer electrode 202A and an electrode 112 of a PCB 110 seen through a transparent package window 202 may be precisely aligned with eyes, and then, as described above with reference to FIG. 9, by irradiating a high-energy laser 80 onto the window outer electrode 202A, the window outer electrode 202A may be electrically connected to the electrode 112 of the PCB 110 through a soldering process (a noncontact laser soldering process) of sequentially melting and cooling a soldering layer 90 disposed between the window outer electrode 202A and the electrode 112 of the PCB 110.

Moreover, bonding pads 113 of the PCB 110 may be bonded to bonding pads 219 of the package window 202 through the same soldering process (noncontact laser soldering process).

Figure 13:
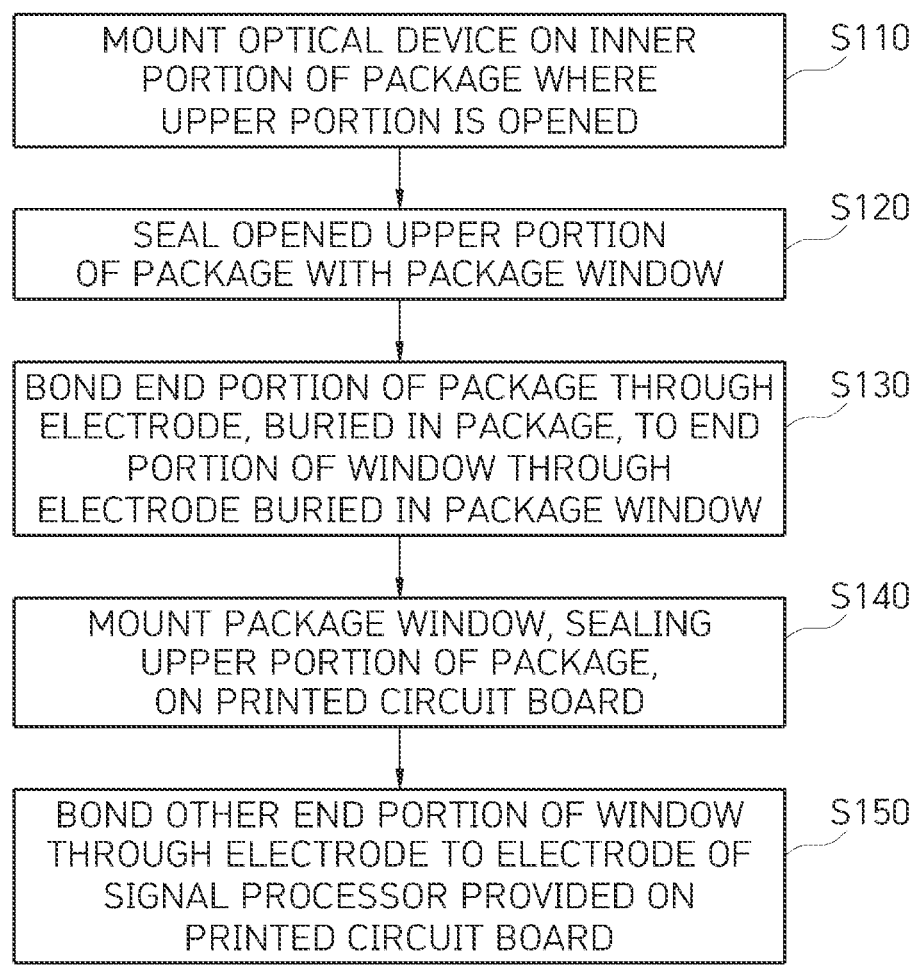
FIG. 13 is a flowchart illustrating a method of manufacturing a multi-channel optical sub-assembly according to an embodiment of the present invention.

FIG. 13 is a flowchart illustrating a method of manufacturing a multi-channel optical sub-assembly according to an embodiment of the present invention.

Referring to FIG. 13, in step S110, an optical device which converts an electrical signal into an optical signal may be mounted in a package where an upper portion is opened.

Subsequently, in step S120, the upper portion of the package may be sealed by a package window.

Subsequently, in step S130, an end portion of a package through electrode buried in the package may be bonded to an end portion of a window through electrode buried in the package window.

Subsequently, in step S140, the package window sealing an upper portion of the package may be mounted on a PCB on which a signal processor generating the electrical signal is mounted.

Subsequently, in step S150, the other end portion of the window through electrode may be bonded to an electrode of the signal processor provided on the PCB.

In an embodiment, when the package is seen from above, step S130 may include a step of aligning a position between the package outer electrode and the window inner electrode observed with eyes through the package window upward exposed by a groove formed in a side surface of the package and a step of bonding the position-aligned package outer electrode to the position-aligned package inner electrode by using a solder and a high-energy laser passing through the package window upward exposed by the groove.

In an embodiment, when the package is seen from above, step S140 may be a step of bonding a bonding pad of the PCB to a bonding pad of the package window by using the high-energy laser passing through the package window upward exposed by the groove formed in the side surface of the package.

In an embodiment, when the package is seen from above, step S150 may include a step of aligning a position between the package outer electrode and an electrode of the signal processor observed with eyes through the package window upward exposed by the groove formed in the side surface of the package and a step of bonding the aligned package outer electrode to the aligned electrode of the signal processor by using the solder and the high-energy laser passing through the package window upward exposed by the groove.

According to the embodiments of the present invention, without a flexible printed board, a distance between a package electrode of a transmitter optical sub-assembly and an electrode of a PCB included in an electrical sub-assembly may be maximally reduced without a flexible circuit board, and thus, the transmission loss of an electrical signal may be minimized.

Moreover, because a TOSA is placed on a PCB, a transmission distance of an electrical signal may be minimized to within several mm, and thus, the loss of a high frequency signal may be more minimized. Simultaneously, power consumption needed for signal restoration may be reduced, and a signal bandwidth of a TOSA may increase.

Moreover, a package and a package window may be soldered by using a noncontact laser soldering process based on a local heating process using a laser source, and thus, a problem of reliability such as a reduction in lifetime caused by an increase in a process temperature may be solved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A multi-channel optical sub-assembly comprising:
a printed circuit board with a signal processor mounted thereon;
a package window mounted on the printed circuit board, the package window including a transparent material;
a package mounted on the package window; and
an optical device accommodated into an inner space of the package and configured to convert an electrical signal, input from the signal processor, into an optical signal, wherein the electrical signal sequentially passes through a window through electrode buried in the package window and a package through electrode buried in the package and is input to the optical device.

2. The multi-channel optical sub-assembly of claim 1, wherein the signal processor is electrically connected to one end portion of the window through electrode by a first electrode junction, and
the first electrode junction comprises:
an electrode provided on a surface of the printed circuit board and electrically connected to the signal processor; and
a window outer electrode provided on a first surface of the package window facing the surface of the printed circuit board and electrically connected to the electrode.

3. The multi-channel optical sub-assembly of claim 2, wherein a groove is formed in a side surface of the package, in order to perform a bonding process on the electrode and the window outer electrode.

4. The multi-channel optical sub-assembly of claim 3, wherein, when the package is seen from above, the electrode is electrically connected to the window outer electrode through a soldering process performed by a solder disposed between the electrode and the window outer electrode and a high-energy laser passing through the package window including the transparent material upward exposed by the groove.

5. The multi-channel optical sub-assembly of claim 1, wherein a bonding pad is provided on each of a surface of the printed circuit board and a first surface of the package window facing the surface of the printed circuit board, in order to perform a bonding process on the printed circuit board and the package window.

6. The multi-channel optical sub-assembly of claim 5, wherein a groove is formed in a side surface of the package, and
when the package is seen from above, the bonding pad of the printed circuit board is bonded to the bonding pad of the package window by a high-energy laser passing through the package window including the transparent material upward exposed by the groove.

7. The multi-channel optical sub-assembly of claim 1, wherein one end portion of the package through electrode is electrically connected to an other end portion of the window through electrode by a second electrode junction, and
the second electrode junction comprises:
a window inner electrode provided on a second surface of the package window and electrically connected to the other end portion of the window through electrode; and
a package outer electrode provided on an upper surface of the package, where a second surface of the package window is provided, and configured to electrically connect the window inner electrode to the one end portion of the package through electrode.

8. The multi-channel optical sub-assembly of claim 7, wherein the package further comprises a stepped portion protruding from one sidewall adjacent to the upper surface of the package among four sidewalls configuring the inner space of the package, and
a package inner electrode electrically connecting the other end portion of the package through electrode to the optical device is provided on a surface of the stepped portion.

9. The multi-channel optical sub-assembly of claim 8, wherein a portion of the package inner electrode is buried in the package so as to be electrically connected to an other stepped portion of the package through electrode.

10. The multi-channel optical sub-assembly of claim 8, wherein the package inner electrode is electrically connected to an optical source device included in the optical device by a wire bonding process by using a conductive wire.

11. The multi-channel optical sub-assembly of claim 1, wherein the optical device is mounted on a bottom surface of the inner space by a sub-mount, and
the bottom surface is disposed on the printed circuit board with the package window therebetween.

12. The multi-channel optical sub-assembly of claim 11, wherein heat occurring in the optical device is dissipated to the outside of the package via the sub-mount and the bottom surface.

13. The multi-channel optical sub-assembly of claim 1, wherein the window through electrode comprises a plurality of window through electrodes divided by channel units, and
the package through electrode comprises a plurality of package through electrodes electrically connected to the plurality of window through electrodes.

14. The multi-channel optical sub-assembly of claim 13, wherein the optical device comprises:
a plurality of optical source devices configured to convert a plurality of electrical signals, input from the signal processor via the plurality of window through electrodes and the plurality of package through electrodes, into a plurality of lights;
a plurality of lenses configured to respectively receive the plurality of lights;
an optical wavelength multiplexer configured to combine the plurality of lights incident through the plurality of lenses to generate one light traveling through one optical path; and
a first mirror configured to change an optical path of the one light, which is incident in a horizontal direction from the optical wavelength multiplexer, to a vertical-direction optical path to irradiate the one light onto the package window.

15. The multi-channel optical sub-assembly of claim 14, wherein the multi-channel optical sub-assembly further comprises an optical fiber block including a focusing lens configured to focus the one light irradiated from the first mirror through the package window and a second mirror configured to change an optical path of the focused light to a horizontal-direction optical path to transfer the focused light to an optical fiber, and the optical fiber block is mounted on a first surface of the package window bonded to a surface of the printed circuit board.

16. The multi-channel optical sub-assembly of claim 15, wherein a groove is formed in one end portion of the printed circuit board, and
in bonding the printed circuit board to the package window, the optical fiber block mounted on the first surface of the package window is accommodated into the groove.

17. A method of manufacturing a multi-channel optical sub-assembly, the method comprising:
mounting an optical device, converting an electrical signal into an optical signal, on an inner portion of a package where an upper portion is opened;
sealing the upper portion of the package with a package window;
bonding an end portion of a package through electrode, buried in the package, to an end portion of a window through electrode buried in the package window;
mounting the package window, sealing the upper portion of the package, on a printed circuit board on which a signal processor generating the electrical signal is mounted; and
bonding an other end portion of the window through electrode to an electrode of the signal processor provided on the printed circuit board.

18. The method of claim 17, wherein, when a first surface of the package window is mounted on the printed circuit board, a second surface of the package window is an opposite surface of the first surface, an upper surface of the package is a surface where the second surface of the package window is provided, a package outer electrode electrically connected to the end portion of the package through electrode is provided on the upper surface of the package, and a window inner electrode is provided on the second surface of the package window,
the bonding the end portion of the package through electrode, buried in the package, to the end portion of the window through electrode buried in the package window comprises:
when the package is seen from above, aligning a position between the package outer electrode and the window inner electrode observed with eyes through the package window upward exposed by a groove formed in a side surface of the package; and
bonding the position-aligned package outer electrode to the position-aligned package inner electrode by using a solder and a high-energy laser passing through the package window upward exposed by the groove.

19. The method of claim 17, wherein, when a first surface of the package window is a surface mounted on a surface of the printed circuit board, a bonding pad is provided on the first surface of the package window, and a bonding pad is provided on the surface of the printed circuit board,
the mounting the package window on the printed circuit board comprises, when the package is seen from above, bonding a bonding pad of the printed circuit board to a bonding pad of the package window by using a high-energy laser passing through the package window upward exposed by a groove formed in a side surface of the package.

20. The method of claim 17, wherein, when a first surface of the package window is a surface mounted on a surface of the printed circuit board, and a window outer electrode electrically connected to the other end portion of the window through electrode is provided on the first surface of the package window,
the bonding the other end portion of the window through electrode to the electrode of the signal processor comprises:
when the package is seen from above, aligning a position between the package outer electrode and the electrode of the signal processor observed with eyes through the package window upward exposed by a groove formed in a side surface of the package; and
bonding the aligned package outer electrode to the aligned electrode of the signal processor by using a solder and a high-energy laser passing through the package window upward exposed by the groove.

* * * * *